United States Patent [19]
Fabris et al.

[11] Patent Number: 5,294,663
[45] Date of Patent: Mar. 15, 1994

[54] TIRE TREAD COMPOSITIONS OF ISOPRENE-STYRENE/BUTADIENE EMULSION POLYMERS WITH 1,4 CIS-POLYISOPRENE RUBBER

[75] Inventors: Hubert J. Fabris, Akron; Ivan G. Hargis, Tallmadge; Russell A. Livigni, Akron; Richard M. Wise, Uniontown, all of Ohio

[73] Assignee: General Tire, Inc., Akron, Ohio

[21] Appl. No.: 936,790

[22] Filed: Aug. 28, 1992

[51] Int. Cl.$^5$ .......................... C08L 7/00; C08L 9/00; C08L 9/06
[52] U.S. Cl. ................................. 524/526; 525/236; 525/237
[58] Field of Search ................. 524/526; 525/236, 237

[56] References Cited

U.S. PATENT DOCUMENTS

| | | | |
|---|---|---|---|
| 4,385,151 | 5/1983 | Furukawa et al. | 524/420 |
| 4,414,363 | 11/1983 | Akita et al. | 525/236 |
| 4,521,587 | 6/1985 | Furukawa et al. | 526/340.2 |
| 4,814,386 | 3/1989 | Hellermann et al. | 525/250 |
| 4,894,420 | 6/1990 | Scriver | 525/237 |
| 4,981,911 | 1/1991 | Herrmann et al. | 525/258 |
| 5,025,059 | 6/1991 | Mouri et al. | 525/237 |
| 5,047,483 | 9/1991 | Halasa et al. | 525/237 |
| 5,053,459 | 10/1991 | Herrmann et al. | 525/237 |
| 5,070,148 | 12/1991 | Hsu et al. | 525/316 |
| 5,087,668 | 2/1992 | Standstrom et al. | 525/237 |
| 5,096,973 | 3/1992 | Herrmann et al. | 525/314 |
| 5,100,967 | 3/1992 | Wolpers et al. | 525/314 |
| 5,159,020 | 10/1992 | Halasa et al. | 525/237 |

FOREIGN PATENT DOCUMENTS

| | | | |
|---|---|---|---|
| 0190398 | 8/1986 | European Pat. Off. | 524/526 |
| 0004221 | 2/1975 | Japan | 524/526 |
| 0145134 | 9/1982 | Japan | 525/237 |
| 0204036 | 11/1983 | Japan | 525/237 |
| 0297437 | 12/1988 | Japan | 524/526 |

*Primary Examiner*—Paul R. Michl
*Assistant Examiner*—Peter Szekely
*Attorney, Agent, or Firm*—Calfee, Halter & Griswold

[57] ABSTRACT

The present invention provides an emulsion polymerization synthetic isoprene-styrene/butadiene rubber for use in improved tire tread compositions is provided. The improved composition is a blend of a 1,4 cis-polyisoprene such as natural rubber and a synthetic rubber produced by emulsion polymerization which synthetic rubber includes isoprene and either styrene or butadiene or both styrene and butadiene. The tire tread composition has an excellent balance of good wear resistance and low rolling resistance as well as a low $T_g$ and good traction. These improved qualities for tire tread compositions have heretofore been unavailable in rubbers utilizing emulsion polymers, and have been achievable only with tire compositions including synthetic rubbers that are produced by solution polymerization.

15 Claims, 1 Drawing Sheet

TIRE TREAD COMPOSITIONS OF ISOPRENE-STYRENE/BUTADIENE EMULSION POLYMERS WITH 1,4 CIS-POLYISOPRENE RUBBER

FIELD OF THE INVENTION

This invention relates generally to compositions for tire treads, and more particularly to compositions for tire treads which contain emulsion polymers of isoprene and butadiene and/or styrene blended with 1,4 cis-polyisoprene, either as a synthetic or natural rubber. In more particular aspects, this invention relates to emulsion polymer/natural rubber tire tread compositions which have properties comparable to solution polymer/natural rubber tire tread compositions, and superior to those of tire treads formed with emulsion styrene-butadiene/natural rubber blends.

BACKGROUND

There are many different properties which are desirable in automotive tires, and the designers and builders of tires utilize many different rubber blends for different tire components, such as treads, side walls, etc. in an attempt to optimize the various properties of the tire. One of the components of a tire is the tire tread component and this component itself requires many different properties which designers attempt to optimize. For example, lower energy consumption of vehicles is a continuing goal and one factor in the energy consumption of vehicles is the rolling resistance of the tire which is a function primarily of the tire tread composition. Additionally, it is desirable to have a high wear resistance of the tread to avoid early or premature wear of the tire which takes place due to normal operating and certain abnormal conditions. Additionally, it is not only desirable but essential to have a reasonably good traction of the tire so that it provides the necessary skid resistance to the vehicle. Moreover it is also desirable to have a relatively low $T_g$ (i.e. glass transition temperature) of the tire in order that the tires will not fail in extremely cold weather. Moreover, various ingredients of the rubber compositions while improving one property may adversely affect one or more of the other properties. Thus, a primary goal of the tire designers and makers is to provide a rubber composition for the tread component of the tire which seeks to optimize these various properties by balancing the selection of relative amounts of these ingredients without causing any one of desired properties to be unduly unfavorable.

In the blending of the compositions for use as a tire tread component, it is conventional to blend natural rubber with different synthetic rubbers formed by various polymerization processes. Some of the original work done in this field provided polymer blends of various butadiene rubbers with emulsion SBR. Emulsion polymerization was developed extensively and there is extensive use of emulsion polymerization because of certain technological advantages as well as economic advantages in using existing equipment. However, emulsion polymerization has some draw backs and limitations as to the type of products it can produce. Specifically, emulsion polymerization generally is not capable of clearly controlling the diene microstructure of the produced rubbers such as the percent of vinyl in the polymerized product. This in turn has posed limitations as to the properties which could be achieved since various microstructures such as the amount of vinyl groups and other microstructure configurations affect certain properties of the end product.

These draw backs, which are limitations in emulsion polymerization, were overcome by the development of solution polymerization of synthetic rubbers. In solution polymerization there is the possibility of using different catalysts and modifiers, different solvents, different temperatures and varying other types of ingredients and conditions to more closely control the resulting microstructure over a much broader range of polydiene microstructures, especially the ability to control the vinyl content over a much broader range than with emulsion polymerization which generally is limited to the range of about 18-24% vinyl. However, solution polymerization requires new facilities and cannot be accomplished in those facilities which are constructed and utilized for emulsion polymerization without extensive reconstruction. Further, solution polymerization requires the use of organic solvents and expensive materials as well as requiring complex recovery systems for the waste products. Therefore, it would be desirable to provide synthetic rubbers which would provide compounds for tire treads which can be made by emulsion polymerization and which would have improved properties matching those achieved with synthetic rubbers produced by solution polymerization.

SUMMARY OF THE INVENTION

According to the present invention an emulsion polymerization synthetic isoprene-styrene/butadiene rubber for use in improved tire tread compositions is provided. The improved composition is a blend of a 1,4 cis-polyisoprene such as natural rubber and a synthetic rubber produced by emulsion polymerization which synthetic rubber includes isoprene and either styrene or butadiene or both styrene and butadiene. The tire tread composition has an excellent balance of good wear resistance and low rolling resistance as well as a low $T_g$ and good traction. These improved qualities for tire tread compositions have heretofore been unavailable in rubbers utilizing emulsion polymers, and have been achievable only with tire compositions including synthetic rubbers that are produced by solution polymerization.

DESCRIPTION OF THE PREFERRED EMBODIMENT

Figure 1:
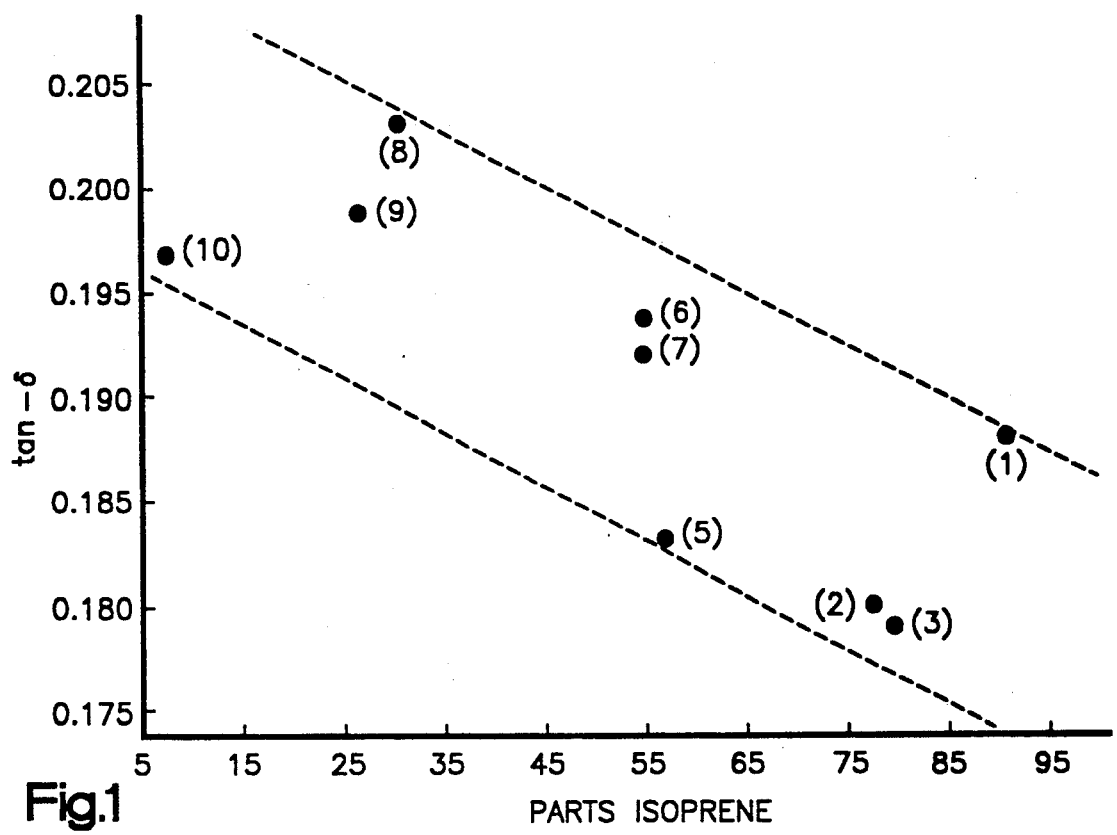
FIG. 1 is a graphical plotting of the values of Tan $\delta$ for various compositions of tire tread material.

The synthetic rubbers used in the tire tread composition of the present invention including styrene-isoprene (E-SIR) or isoprene-butadiene (E-IBR), or styrene-isoprene-butadiene rubber (E-SIBR) were prepared by cold emulsion polymerization. E-SIR was prepared according to the recipe in Table 1. The cold emulsion polymerizations were accomplished by conventional free radical polymerization techniques well known in the art. See for example, "Synthetic Rubber," G.S. Whitby, C. C. Davis, and R. E. Dunnbrook, Eds , Pg. 213-219 John Wiley & Sons, Inc. New York, N.Y.

TABLE I

SIR Emulsion Polymerization Recipe

| Ingredient | Parts by Weight |
| --- | --- |
| Isoprene | 82.0 |
| Styrene | 18.0 |
| Water | 175.0 |
| Rosin Acid Soap (Dresinate 214) | 5.0 |
| t-Dodecanethiol | 0.14 |
| p-Menthane Hydroperoxide | 0.1 |
| Trisodium Phosphate | 0.5 |
| Ferrous Sulfate | 0.008 |
| Sodium Formaldehyde Sulfoxylate | 0.1 |
| Sodium Hydroxide | 0.006 |
| Sequestrene AA | 0.015 |
| Tamol SN | 0.5 |
| Polymerization Temperature (°C.) | 5 |
| Polymerization Time (Hrs.) | 15 |
| % Conversion | 61 |

For comparison purposes, emulsion polymers of styrene/butadiene (E-SBR) were prepared which represent conventional prior art emulsion polymerization rubber compositions, as well as solution polymers of styrene/butadiene rubber (MVSBR). The microstructure as determined by high field NMR as well as the glass transition temperature ($T_g$) and molecular weight are listed for these three compositions in Table II.

TABLE II

Characterization Data of a Cold Emulsion Styrene-Isoprene Copolymer and Control Polymers

| Polymer Type | % Styrene | Microstructure % Cis | Trans | 3,4 (1,2) | $T_g$, °C. DSC | Molecular Weight Mn (osmometry) |
| --- | --- | --- | --- | --- | --- | --- |
| E-SIR | 14 | 24 | 66 | 10* | −46 | 96,000 |
| E-SBR | 15 | 12 | 72 | (16) | −66 | 69,000 |
| MVSBR | 16 | 23 | 32 | (44) | −54 | 180,000 |

*A very small amount of 1,2 appears to be present which is superimposed on the 3,4 (in the NMR spectrum).

The MVSBR was prepared in cyclohexane with N-butyllithium and tetramethylenediamine. The emulsion styrene butadiene rubber was prepared using the recipe of Table 1 but with butadiene substituted for isoprene.

Tire tread rubber compositions were then prepared according to the formulations shown in Table III. These were prepared with the compounds being mixed on a two roll 10 inch mill and then cured at a 160° C. to maximum torque as measured by a Monsanto Rheometer. Tread vulcanization properties were determined as follows: Loss tangent delta (Tan δ) was measured by means of an instrumented Yerzley Oscillograph (IYO) at room temperature and 5Hz. The Yerzley Oscillograph is a good predictor of twin-roll rolling resistance of tire tread material formulations. The lower the Tan δ value, the lower the rolling resistance which lower rolling resistance is a desirable property. Wet coefficient of friction (μ-Wet) was measured on an instrumented British Portable Skid Tester (IPST) on a smooth concrete surface. This test shows good correlation of μ-Wet with wet tire traction data (peak traction at 96.6 kilometers per hour). The higher the μ-Wet the better the traction performance on a wet concrete road. For comparison purposes this instrument measured a μ-Wet of 0.629 for a 65/35 emulsion SBR/Cis-BR tread formulation used on the ASTM pavement skid resistance test tire.

TABLE III

Compound Formulations

| Ingredients | A | B | C | D |
| --- | --- | --- | --- | --- |
| Polymer | 50.0 | 100.0 | 100.0$^a$ | 100.0$^b$ |
| Natural Rubber | 50.0 | — | — | — |
| ISAF Black | 30.0 | — | — | — |
| N-351 Black | 20.0 | — | — | 70.0 |
| N-339 Black | — | — | 45.0 | — |
| Circosol | 14.0 | — | 10.0 | 10.0 |
| Sundex 8125 | — | — | — | 20.0 |
| Zinc Oxide | 3.0 | 3.0 | 3.0 | 3.3 |
| Wax | 2.5 | — | — | 2.5 |
| Antioxidant | 1.2 | — | 1.2 | 1.2 |
| Stearic Acid | 0.5 | 2.5 | 2.5 | 0.5 |
| Irganox 565 | — | 1.0 | — | — |
| Vulkacit DZ | 2.25 | — | — | 2.1 |
| TBBS | 0.5 | — | 1.52 | 0.5 |
| Santocure CBS | — | 1.75 | — | — |
| Santogard PVI | 0.1 | 0.3 | — | 0.1 |
| Sulfur | 2.72 | — | — | 2.0 |
| Crystex | — | 3.5 | 2.72 | — |

$^a$polyisoprene - 50 phr, MVSBR - 50 phr.
$^b$E-SIR - 33 phr, NR - 31 phr, LVSBR - 36 phr.

The comparison of the various tread vulcanizate properties of the three different rubbers blended with natural rubber in a 50:50 ratio is shown in Table IV below. With the styrene content at a level of about 15% by weight, the main variables include the diene microstructure and type of polydiene. As can be seen from the examination of Table II, the $T_g$ of the E-SIR SIR is higher than that of the E-SBR and the $T_g$ of the medium vinyl SBR with 45% vinyl content is intermediate to that of the emulsion polymers. The data in Table IV indicates that the rolling resistance (Tan δ) of E-SIR is significantly lower than E-SBR and nearly the same as MVSBR. However, the E-SIR has a lower μ-Wet and lower Pico abrasion resistance than a MVSBR. E-SIR can be seen to have slightly better wet traction behavior but lower Pico abrasion resistance than E-SBR. The Pico Abrasion test was run as described in ASTM D 2228. The higher the number, the better the abrasion resistance. In summary, it appears that the emulsion polymer E-SIR has values very comparable to the medium vinyl solution polymerized rubber and has much better rolling resistance and better traction than the emulsion styrene butadiene rubber.

TABLE IV

Comparison of Tread Properties* Using E-SBR, E-SIR, and MVSBR

| Polymer | Yerzley Tan Delta (Rolling Resistance) | Pico Abrasion Index (Wear Resistance) | IPST, μ-Wet (Traction) |
| --- | --- | --- | --- |
| E-SIR | 0.176 | 70 | 0.613 |
| E-SBR | 0.198 | 79 | 0.606 |
| MVSBR** | 0.171 | 73 | 0.632 |

*Tread Compound: Table III, Formulation A
**45%, 1,2: 15% styrene

To compare the properties of the synthetic rubbers, various tests were performed on the E-SIR, E-SBR and MVSBR in the unfilled condition which test results are shown in Table V. This data in Table V shows that in the absence of carbon black and natural rubber, emulsion polymer SIR is very comparable to the MVSBR and both the E-SIR and the MVSBR have tan δ values significantly better than the E-SBR.

TABLE V

Comparison of Yerzley Tan Delta Values of Unfilled Vulcanizates* of E-SIR, Solution MVSBR, and E-SBR

| Polymer** | $T_g$, °C. | Yerzley Tan Delta |
|---|---|---|
| E-SIR | −46 | 0.062 |
| MVSBR | −54 | 0.064 |
| E-SBR | −66 | 0.086 |

*Recipe: Table III, Formulation B
**Polymers same as shown in Table II

Table VI below shows certain characteristics of Emulsion IR as compared to Solution IR and natural rubber, including microstructure and key tread property indicators. This includes Tan δ and μ-Wet skid coefficient of friction and Pico abrasion resistance test.

TABLE VI

Comparison of Tread Properties* Using Emulsion and Solution Polyisoprenes

| Polymer | Polymer Characterization | | | | Tread Properties | | |
|---|---|---|---|---|---|---|---|
| | % Microstructure | | | ML-4 | Tan | μ-Wet Skid | Pico |
| | 3,4 | Cis | Trans | (100° C.) | δ | Coef. | Index |
| Emulsion IR | 10 | 24 | 66 | 59 | .196 | .597 | 93 |
| Solution IR | 4 | 91 | 5 | 69 | .190 | .600 | 92 |
| Natural Rubber | — | 100 | — | 90 | .168 | .604 | 87 |

*Tread Compound: Table III, Formulation C

Figure 2:
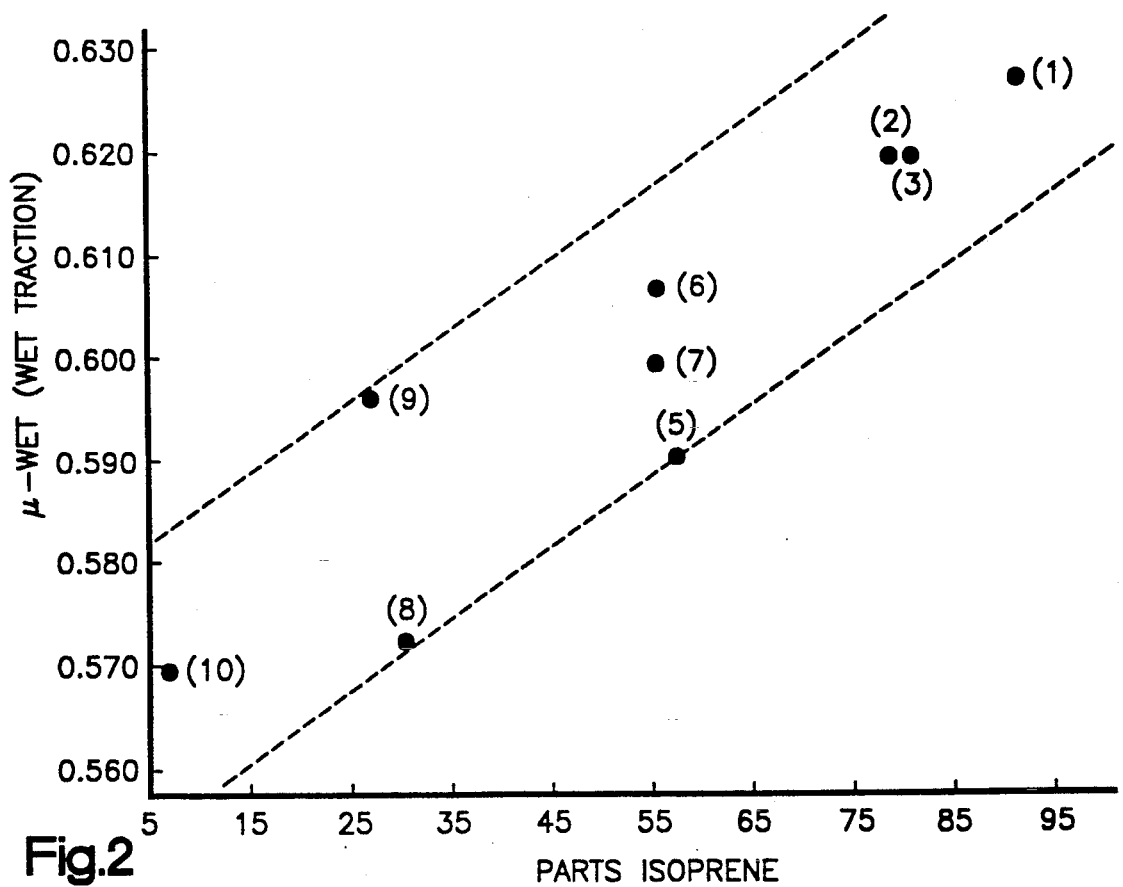
FIG. 2 is a graphical plotting of $\mu$-Wet of various compositions of tire tread material.

Since the cost of butadiene monomer is less than isoprene monomer, various different compositions of polymers which substituted butadiene for some of the isoprene monomer were formulated with the exception of Example 4, the various polymers were then blended at a ratio of 50:50 with natural rubber as shown in Table VII to formulate tire tread compositions. The results of various tests to determine tread vulcanizate properties of these formulations are shown in Table VII; specifically, the Yerzley Tan δ, Pico abrasion index and IPST μ- Wet are shown for various blends of these rubbers. The Yerzley tan δ values are also shown graphically in FIG. 1 and the μ-Wet properties are also shown graphically in FIG. 2.

TABLE VII

Tread Vulcanizate Properties of Emulsion Polymers Containing Isoprene*

| Example | Polymer Comp** Bd/I/St | Yerzley Tan Delta (Rolling Res.) | Pico Abrasion Index (Wear Res.) | IPST, μ-Wet (Traction) |
|---|---|---|---|---|
| 1 | 0/91/9 | 0.188 | 80 | 0.628 |
| 2 | 18/78/4 | 0.180 | 86 | 0.619 |
| 3 | 8/80/12 | 0.179 | 80 | 0.619 |
| 4 | 30/53/17 | 0.208 | 83 | 0.622 |
| 5 | 43/57/0 | 0.183 | 92 | 0.590 |
| 6 | 36/55/9 | 0.194 | 85 | 0.607 |
| 7 | 36/55/9 | 0.192 | 88 | 0.599 |
| 8 | 62/31/7 | 0.203 | 91 | 0.572 |
| 9 | 59/27/14 | 0.199 | 88 | 0.596 |
| 10 | 85/8/7 | 0.197 | 91 | 0.569 |

*Compound: Table III, Formula A.
**Composition determined by 13C NMR.

As indicated earlier, the lower the value of Yerzley Tan δ, the lower the rolling resistance of the tire; the higher the Pico abrasion index, the better the abrasion resistance of the tire; and the greater the value of the IPST μ-Wet, the better traction properties of the tire. As can be seen from Table VII and FIGS. 1 and 2, Examples 2, 3 and 5 have the best values for the Yerzley tan δ value and therefore the best performance with respect to rolling resistance. Examples 1, 2, 3 and 4 have the best μ-Wet, thus the best traction. Thus, Compositions 2 and 3 have the best combination of these two values with Example 1 also having a good combination of these values although all of the examples given are acceptable. It should be noted, however, that when the μ-Wet drops below about .600, the traction value becomes less desirable and thus, Compositions 5, 7, 8, 9 and 10 are less desirable than the compositions of Examples 2 and 3 which are the preferred examples. Between Examples 2 and 3, Example 2 has the better abrasion resistance which makes it the preferred composition for tire treads. Thus, broadly, the present invention includes a rubber composition having a mixture of between 30% and 70% of 1,4 cis-polyisoprene, preferably about 50% thereof and between 70% and 30% of an emulsion copolymer rubber comprised of an isoprene monomer and a second monomer selected from the group of butadiene and styrene and mixtures thereof, preferably about 50% thereof. Further, while either styrene or butadiene may be used, it is preferred that both styrene and butadiene be present in the ranges of 4–17% and more preferably 4–16% styrene monomer, and 8–85% more preferably 8–30% butadiene monomer.

Finally, compositions were mixed using mixtures of emulsion isoprene styrene rubber, natural rubber and low vinyl styrene butadiene rubber and compared with compositions containing medium vinyl solution styrene-butadiene rubber (MVSBR), low vinyl solution styrene-butadiene rubber (LVSBR) and natural rubber these results are shown in Table VIII. As can be seen in Table VIII good results are obtained when the emulsion isoprene styrene rubber is substituted for MVSBR with there actually being an improvement in the Yerzley tan δ for rolling resistance and an improvement in wet traction with μ-Wet and essentially no change in abrasion resistance.

TABLE VIII

Comparison of Tread Properties* of Blends Containing E-SIR vs. MVSBR

| Polymer Composition (Blend Right) | Tensile Strength (MPa) | Yerzley Tank δ (Rolling Res.) | Abrasion Index (Wear Res.) | | IPST, μ-Wet (Traction) |
|---|---|---|---|---|---|
| | | | Pico | Angle Abrader*** | |
| 85-15 Isoprene-Styrene/NR/LVSBR (33/31/36), B358-95A | 16.6 | 0.362 | 90 | 102 | 0.653 |

TABLE VIII-continued

Comparison of Tread Properties* of Blends Containing E-SIR vs. MVSBR

| Polymer Composition (Blend Right) | Tensile Strength (MPa) | Yerzley Tank δ (Rolling Res.) | Abrasion Index (Wear Res.) Pico | Abrasion Index (Wear Res.) Angle Abrader*** | IPST, μ-Wet (Traction) |
| --- | --- | --- | --- | --- | --- |
| MVSBR/NR/LVSBR | 17.2 | 0.378 | 91 | 100 | 0.641 |

*Compound: Table III, Formulation D
**MVSBR: 15% Styrene, 45% vinyl
LVSBR: 21% Styrene, 10% vinyl
***Modified Goodyear Angle Abrader with a test angle of 11°

Certain substitutions of materials which would not essentially change the characteristics of the invention will be readily apparent to those skilled in the art. For example, natural rubber is used in formulating the tire tread compositions in the examples. However, 1,4 cis-polyisoprene synthetic rubber can also be used to achieve similar results.

While the invention has been shown and described in a certain amount of detail, various adaptations and modifications can be made without departing from the scope of the invention as defined in the appended claims.

What is claimed is:

1. A rubber composition for use as a tire tread comprising a mixture of 30% to 70% 1,4 cis-polyisoprene and 70%–30% of an emulsion co-polymer rubber comprised of an isoprene monomer, a styrene monomer, and a butadiene monomer there being between about 4% to 17% of the styrene monomer, and between about 8% and about 85% of the butadiene monomer in the emulsion copolymer.

2. The rubber composition as defined in claim 1 wherein there is at least 50% isoprene monomer in said emulsion co-polymer.

3. The rubber composition as defined in claim 1 wherein the traction is at least 0.600 as measured by the IPST μ-Wet traction test.

4. The rubber composition as defined in claim 1 wherein the rolling resistance measured by the Yerzley tan δ is less than 0.186.

5. The rubber composition as defined in claim 1 wherein there is about 4–14% styrene monomer and about 8–30% butadiene monomer, is said emulsion co-polymer.

6. The rubber compositions as defined in claim 1 wherein there is about 4% styrene monomer and about 18% butadiene monomer, in said emulsion co-polymer.

7. The rubber composition as defined in claim 1 wherein the 1,4 cis-polyisoprene is natural rubber.

8. The composition as defined in claim 1 wherein there is about equal parts of 1,4, cis-polyisoprene and the emulsion co-polymer.

9. A rubber composition for use as a tire tread comprising a mixture of 30% to 70% 1,4 cis-polyisoprene and 70%–30% of an emulsion co-polymer rubber comprised of an isoprene monomer and a butadiene monomer there being between 8 and 85% monomer in the emulsion co-polymer.

10. The rubber composition as defined in claim 9 wherein there is at least 50% isoprene monomer.

11. The rubber composition as defined in claim 9 wherein the traction is at least 0.600 as measured by the IPST μ-Wet traction test.

12. The rubber composition as defined in claim 9 wherein the rolling resistance measured by the Yerzley tan δ is less than 0.186.

13. The rubber composition as defined in claim 9 wherein the 1,4 cis-polyisoprene is natural rubber.

14. The composition as defined in claim 9 wherein there is about equal parts of 1,4, cis-polyisoprene and the emulsion co-polymer.

15. The composition as defined in claim 9 wherein said emulsion polymer includes an effective amount up to 17% of a styrene monomer in said emulsion copolymer to increase wet traction.

* * * * *

UNITED STATES PATENT AND TRADEMARK OFFICE
CERTIFICATE OF CORRECTION

PATENT NO. : 5,294,663
DATED : March 15, 1994
INVENTOR(S) : Fabris, et al.

It is certified that error appears in the above-indentified patent and that said Letters Patent is hereby corrected as shown below:

Column 8, line 14: "compositions" should be changed to --composition--

Column 8, line 26: after 85%, please add --of the butadiene"

Column 8, line 29: please delete the "." and add --in said emulsion co-polymer.--

Signed and Sealed this

Second Day of August, 1994

Attest:

BRUCE LEHMAN

Attesting Officer          Commissioner of Patents and Trademarks